United States Patent
Kie et al.

(10) Patent No.: US 9,364,980 B2
(45) Date of Patent: Jun. 14, 2016

(54) MOLDING APPARATUS FOR ROTOR OF MOTOR

(71) Applicants: HYUNDAI MOTOR COMPANY, Seoul (KR); Kia Motors Corporation, Seoul (KR)

(72) Inventors: Jae Young Kie, Seongnam-si (KR); Jung Woo Lee, Hwaseong-si (KR); Kwang Keyong Sung, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/569,536

(22) Filed: Dec. 12, 2014

(65) Prior Publication Data

US 2015/0343683 A1 Dec. 3, 2015

(30) Foreign Application Priority Data

May 29, 2014 (KR) .......................... 10-2014-0064986

(51) Int. Cl.
*B29C 45/14* (2006.01)
*B29L 31/00* (2006.01)

(52) U.S. Cl.
CPC ..... *B29C 45/1459* (2013.01); *B29L 2031/7498* (2013.01)

(58) Field of Classification Search
CPC B29C 45/1459; B29C 33/123; B29C 33/304; B29C 33/70; B29L 2031/7498
USPC ........................................ 264/272.2; 425/193
See application file for complete search history.

(56) References Cited

U.S. PATENT DOCUMENTS

| 1,925,892 | A | * | 9/1933 | Apple | ..................... | H02K 15/12 264/272.2 |
| 3,079,520 | A | * | 2/1963 | Schafer | ................... | H01R 43/06 264/272.2 |
| 2007/0134368 | A1 | * | 6/2007 | Okamoto | ............... | H02K 15/03 425/577 |

FOREIGN PATENT DOCUMENTS

| DE | EP 2078600 A1 | * | 7/2009 | ............ B29C 33/123 |
| JP | 2000-233426 A | | 8/2000 | |
| JP | 2002-142418 A | | 5/2002 | |
| JP | 2006-211887 A | | 8/2006 | |
| JP | 2009-017701 A | | 1/2009 | |
| JP | 2011-088329 A | | 5/2011 | |
| KR | WO 2005042227 A1 | * | 5/2005 | ............. B29C 45/36 |
| KR | 10-1127527 B1 | | 3/2012 | |
| KR | 20-0459395 Y1 | | 3/2012 | |

* cited by examiner

*Primary Examiner* — Robert B Davis
(74) *Attorney, Agent, or Firm* — McDermott Will & Emery LLP

(57) ABSTRACT

The present disclosure relates to a molding apparatus for fixing a magnet in a rotor core of a permanent magnet synchronous motor. The present disclosure provides a molding process for a rotor of a motor which can reduce manufacturing costs through alleviation of a tolerance of an introduced product and reduction of an error rate of a finished injection-molding product, by applying a lift core which may variably move in a mold during an insert injection molding process for molding a rotor and accordingly a new type of rotor molding method for a permanent magnet synchronous motor which prevents generation of a flash in an injection molding process even when the size and tolerance of the introduced product deteriorate as compared with a mold.

5 Claims, 5 Drawing Sheets

MOLDING APPARATUS FOR ROTOR OF MOTOR

CROSS-REFERENCE TO RELATED APPLICATION

This application claims under 35 U. S. C. §119(a) the benefit of Korean Patent Application No. 10-2014-0064986 filed on May 29, 2014, the entire contents of which are incorporated herein by reference.

BACKGROUND (a) Technical Field

The present disclosure relates to a molding apparatus for a rotor of a motor, and more particularly to a molding apparatus for fixing a magnet in a rotor core of a permanent magnet synchronous motor.

(b) Background Art

In general, a driving motor as a power source is used in environmental vehicles such as hybrid electric vehicles or electric vehicles. Like a general motor, the driving motor includes a stator in which a coil is wound on a stator coil, and a rotor disposed within the stator and in which a permanent magnet is inserted into a rotor core.

In general, in order to fix a permanent magnet to the rotor core, a method of applying a bond to a permanent magnet insertion hole of a rotor core, inserting a permanent magnet into the permanent magnet insertion hole, and curing the bond, or an insert insertion method of injecting a resin in a permanent insertion hole of a rotor core into which a permanent magnet is inserted and curing the resin is mainly used.

For example, a method of disposing a rotor core into which a permanent magnet is inserted within an upper mold and a lower mold, injecting a resin into a space in a permanent insertion hole in which the permanent magnet is positioned, and fixing the permanent magnet is mainly used. However, the insertion injection molding requires the following premises. That is, when the size and the shape tolerance of a product are smaller than those of a mold, the product should be able to move in the mold. In contrast, when a precise insert injection molding process is necessary, a product should be fixed and the size and shape tolerance of the product should be those of the mold or more. Otherwise, a flash is essentially generated in the injection molding process.

When a high speed/high torque/high durability condition is required as in a rotor of a driving motor for environmental vehicles, the latter condition should be satisfied for a precise molding performance. However, the flatness and parallelism of a rotor core made by stacking thin plates are lower than those of a precise product due to incomplete attachment of the thin plates caused by embossing for a thickness deviation of a thin plate of the core and stacking of the thin plates. Accordingly, flashes may be frequently generated in theory.

In the rotor core, the plates are assembled through embossing in a progressive mold and then the product is extracted. The coupling is progressed by a press in a mold, and the thickness of the rotor core is measured while being pressed. However, after the product is extracted, the core is swollen again by incomplete adhesion of the thin plates due to embossing (spring back). When the mold is closed, the stack thickness of the core having the characteristics is larger than a distance between the upper and lower plates. When the mold is closed, the thickness of the core is reduced, and in this process, the uppermost plate and the lowermost sheet have an improved precision by the precise and strong mold. Further, the intermediate core plates are deformed to a natural state as in a soft material.

A stack core which does not satisfy the premises of a general insert injection molding process may be molded through the mechanism. However, in recent years, a method of stacking a core employs a coupling method not using embossing but using a bond. Accordingly, a spring back phenomenon is reduced as compared with a embossed core, so that flashes are frequently generated.

SUMMARY

In accordance with an aspect of the present disclosure, there is provided a molding apparatus for a rotor of a motor, which is adapted to perform a process of molding a rotor core through insert injection-molding and includes an upper core and a lower core disposed on upper and lower sides while a rotor core is interposed between the upper core and the lower core, and a slide core disposed on a side surface of the rotor core, the molding apparatus further including: a lift core disposed at a bottom of the rotor core around the lower core, for pressing the rotor core while moving vertically; and a hydraulic slide mechanism for vertically moving the lift core through a forward/rearward linear movement.

The lift core may be a combination of an upper lift core contacting the rotor core, a lower lift core contacting a hydraulic slide mechanism, and a middle lift core assembled between the upper lift core and the lower lift core, and the upper lift core and the middle lift core may contact each other through spherical surfaces, and the upper lift core may be rotated and slid forwards, rearwards, leftwards, and rightwards.

Stopper recesses and stopper bosses, which are fitted with each other, may be formed on the spherical surfaces of the upper lift core and the middle lift core, such that rotation and sliding of the upper lift core is controlled.

Four combinations of the stopper recesses and the stopper bosses may be disposed at an interval of 90 degrees in a circumferential direction of the lift core.

The hydraulic slide mechanism may include a hydraulic cylinder, and a slider connected to a rod of the hydraulic cylinder to linearly move forwards and rearwards and contact the lift core, and the slider and the lift core may contact each other through tapered portions such that the lift core is vertically moved when the slider is linearly moved.

The molding apparatus for a rotor of a motor according to the present disclosure has the following effects.

First, a bond core molding process can be achieved by applying a ball-joint type.

That is, as compared with an embossed core, the bond core can increase the number of stacked sheets, reduce a gap between the stacked sheets, and increase coupling force when the same stack thickness is applied, and can reduce iron loss and increase mechanical strength.

Further, the sizes of inner and outer diameters, and the shape tolerance of the bond core are excellent as compared with an existing embossed core.

Second, deformation of the core can be improved after a molding process by improving performance of a single product core.

That is, because the deformations of the inner and outer diameters and the shape tolerance of the core are small as compared with the embossed core, durability performance of the core can be improved due to a decrease in residual stress, an NVH such as a torque ripple can be improved by making the tolerances uniform through improvement of the tolerance of the outer shape, a design can be stabilized through an electromagnetic analysis design and reduction of the performance difference of the actual product, and assembly quality can be secured through management of pressing degree and tolerances.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

Figure 1:
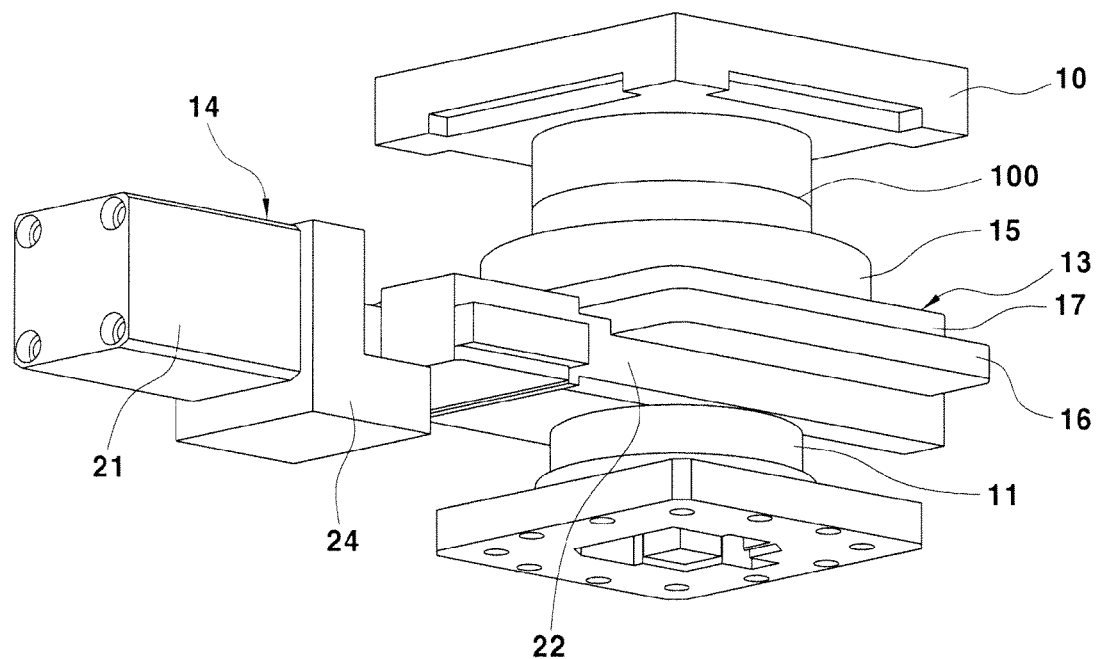
FIG. 1 is a perspective view showing a molding apparatus for a rotor of a motor according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

The present disclosure has been made in an effort to solve the above-mentioned problems. To this end, the present provides a molding process for a rotor of a motor which can reduce manufacturing costs through alleviation of a tolerance of an introduced product and reduction of an error rate of a finished injection-molding product, by applying a lift core which may variably move in a mold during an insert injection molding process for molding a rotor and accordingly a new type of rotor molding method for a permanent magnet synchronous motor which prevents generation of a flash in an injection molding process even when the size and tolerance of the introduced product deteriorate as compared with a mold.

In order to achieve the above-described objects, the molding apparatus for a rotor of a motor according to the present disclosure has the following features. Hereinafter, the present disclosure will be described in detail with reference to the accompanying drawings.

Figure 2:
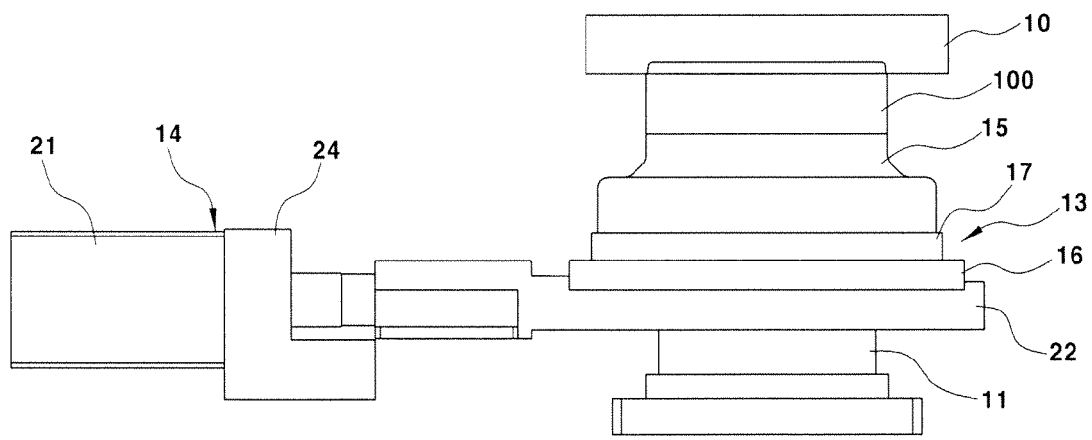
FIG. 2 is a front view showing the molding apparatus for a rotor of a motor according to the embodiment of the present disclosure.
Figure 3:
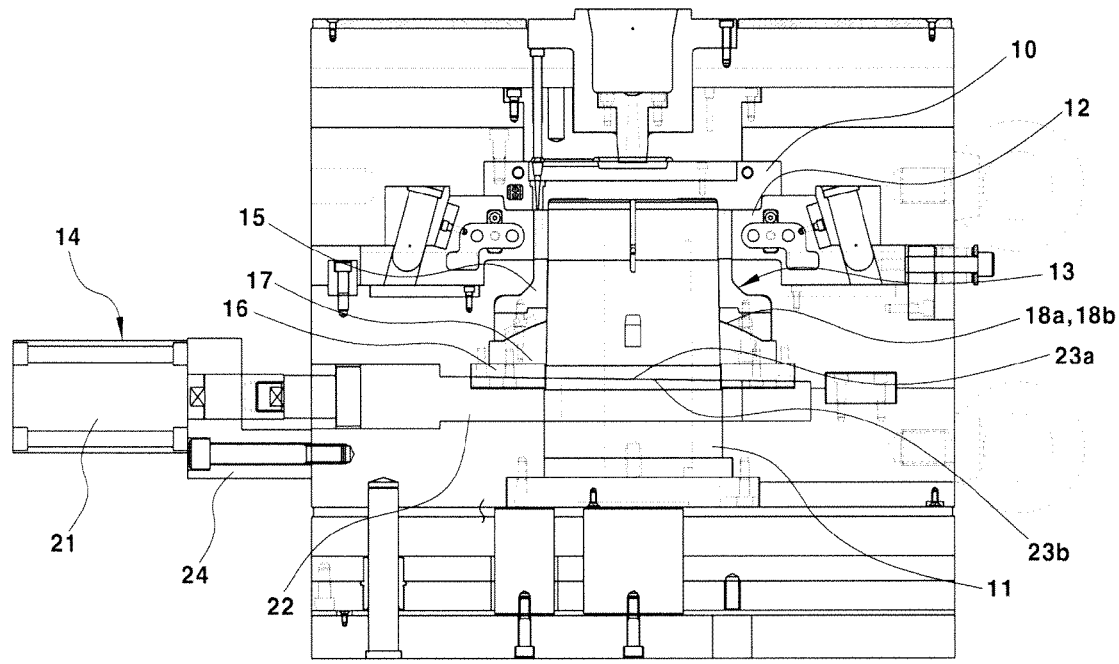
FIG. 3 is a sectional view showing the molding apparatus for a rotor of a motor according to the embodiment of the present disclosure.

FIGS. 1 to 3 are a perspective view, a front view, and a sectional view showing a molding apparatus for a rotor of a motor according to an embodiment of the present disclosure.

As shown in FIGS. 1 to 3, the molding apparatus for a rotor of a motor is an insert injection molding apparatus for fixing a magnet in a rotor core of a permanent magnet synchronous motor, and in particular, prevents generation of a flash (overflow) in an injection molding process by applying a structure for variably moving a mold.

To this end, the molding apparatus for a rotor of a motor includes an upper core 10 and a lower core 11 disposed on upper and lower sides while a rotor core 100 inserted into a mold is interposed therebetween, and a slide core 12 disposed on a side surface of the rotor core 100.

Here, because a disposition and an operational relationship between the upper core 10, the lower core 11, and the slide core 12 are the same as those of a general molding apparatus, a detailed description thereof will be omitted.

Furthermore, the molding apparatus for a rotor of a motor includes a lift core 13 as a unit for attaching (pressing) the rotor core 100 having a stack structure in order to prevent generation of a flash. The lift core 13 is disposed at the bottom of the rotor core 100 to be moved upwards and downwards. To this end, the rotor core 100 is attached between the upper core 10 on the upper side and the lift core 13 on the lower side when the lift core 13 is raised.

A lower core 11 passes through the center axis line of the lift core 13. The upper core 10 is attached to an upper surface of the rotor core 100. The lift core 13 is attached to a bottom surface of the rotor core 100. The lower core 11 is attached to an inner peripheral surface of the rotor core 100. The slide core 12 is attached to an outer peripheral surface of the rotor core 100. In this manner, the entire circumference of the rotor core 100 is surrounded by the upper core 10, the lift core 13, the lower core 11, and the slide core 12 so that a resin can be injected in this state.

Figure 4:
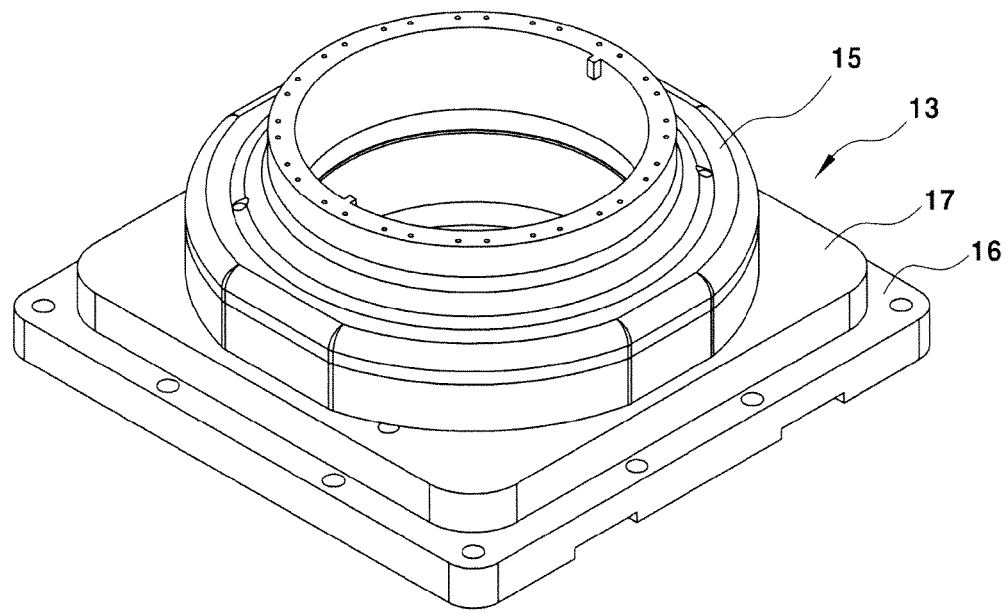
FIG. 4 is a perspective view showing a coupled state of a lift core in the molding apparatus for a rotor of a motor according to the embodiment of the present disclosure.
Figure 5:
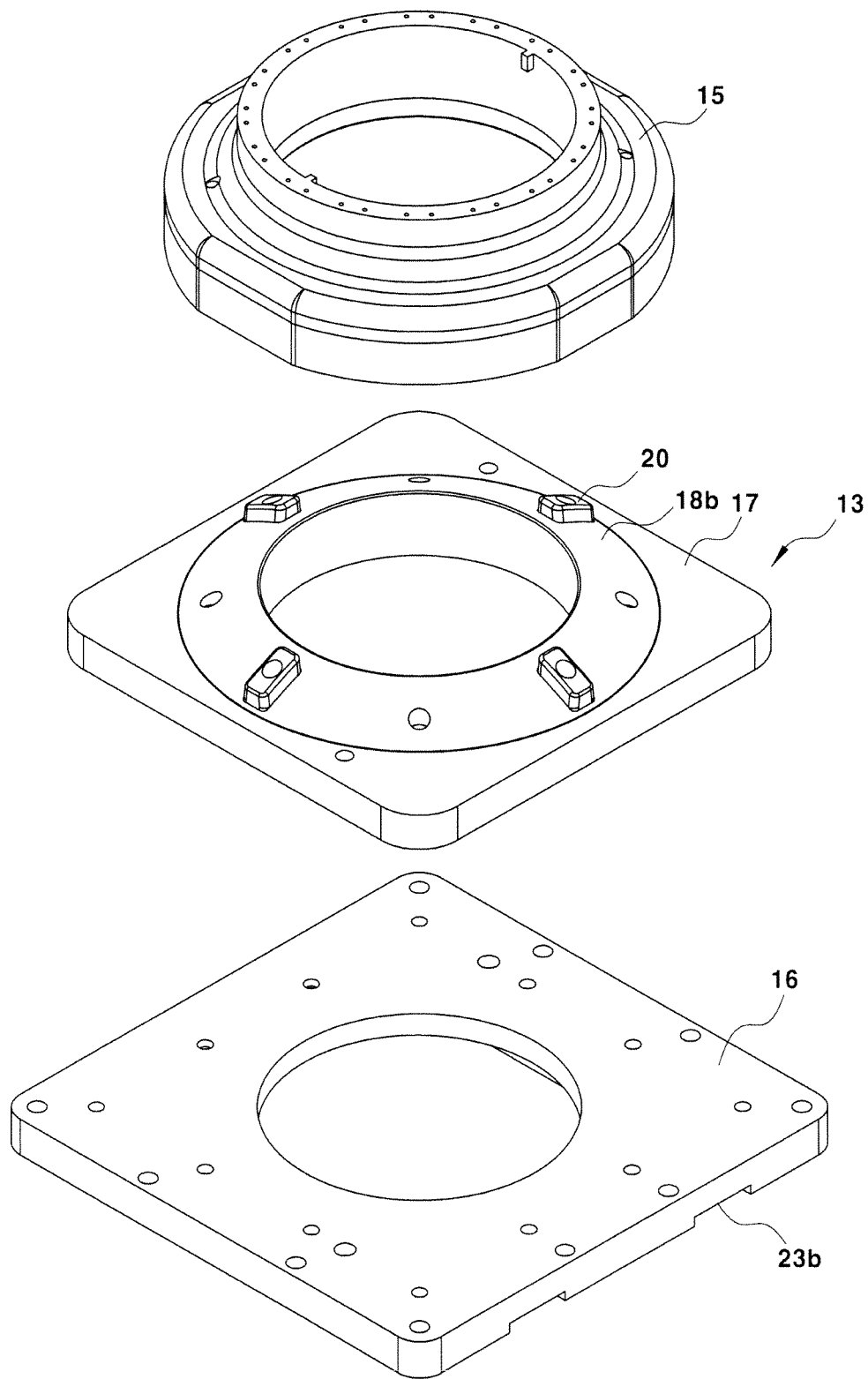
FIGS. 5 and 6 are each an enlarged perspective view showing the lift core in the molding apparatus for a rotor of a motor according to the embodiment of the present disclosure.
Figure 6:
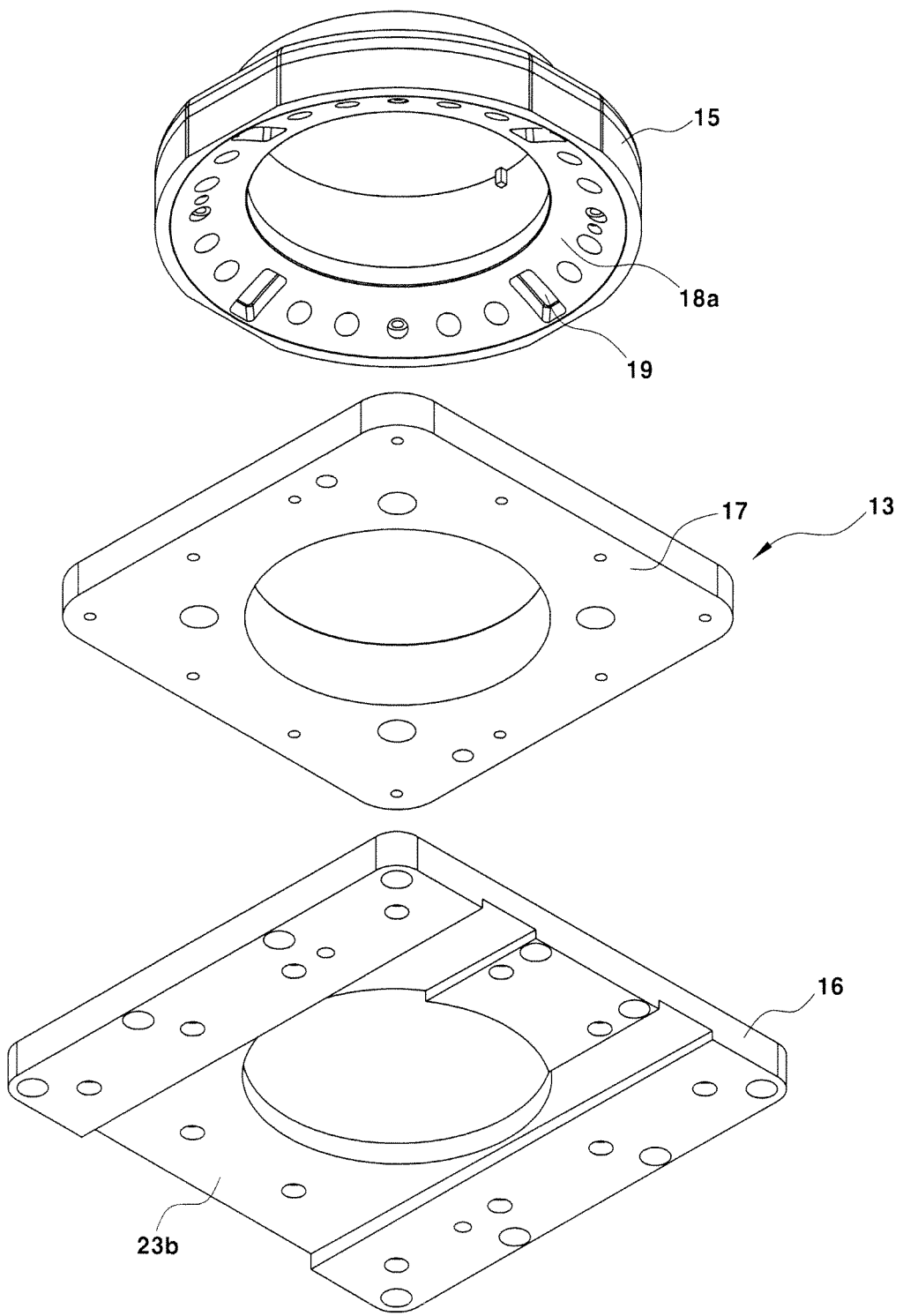

As shown in FIGS. 4 to 6, the lift core 100 is a combination of an upper lift core 15, a middle lift core 17, and a lower lift core 16, which are sequentially vertically stacked. The upper lift core 15 is a circular block having a ring shape while also having a stepped structure, and surrounds a circumference of the lower core 11 through a central hole and contact the bottom surface of the rotor core 100 through an upper surface thereof. The bottom surface of the upper lift core 15 corresponds to a concave spherical surface 18a with the center of the sphere being located on the center axis line of the upper lift core 15. The upper lift core 15 may be attached to a convex spherical surface 18b in the middle lift core 17 through the spherical surface 18a. Accordingly, the upper lift core 15 may be rotated and slid forwards, rearwards, leftwards, and rightwards on the middle lift core 17 using a sliding contact structure between the spherical surfaces 18a and 18b.

A plurality of stopper recesses 19 are formed on the spherical surface 18a on the bottom surface of the upper lift core 15, and stopper bosses 20 in the middle lift core 17 are inserted into the stopper recesses 19. Accordingly, the upper lift core 15 restricts a degree of rotation and slide through a regulation operation between the stopper recesses 19 and the stopper bosses 20 when being rotated and slid on the middle lift core 17.

Here, separations are present between the stopper bosses 20 and the stopper recesses 19 in the insertion structure, in which case the upper lift core 15 may be set to be vertically rotated and slid within a range of about 0.2 mm. It is preferable that the separations between the stopper bosses 20 and the stopper recesses 19 be properly set in consideration of the movement range.

Four combinations of the stopper recesses 19 and the stopper bosses 20 may be provided at an interval of 90 degrees along a circumferential direction of the lift core 13. Accordingly, the upper lift core 15 may be rotated and slid forwards, rearwards, leftwards, and rightwards while the rotation in the circumferential direction thereof is restricted (even though there is a slight movement corresponding to the separations between the stopper bosses and the stopper recesses) and the movement thereof is regulated by the stopper recesses 19 and the stopper bosses 20.

The middle lift core 17 is a four-sided block having a hole for penetration of the lower core 11 at the center thereof, and is interposed between the upper lift core 15 and the lower lift core 16 and integrally coupled to the lower lift core 16 while vertically stacked by a bolting structure while contacting the upper lift core 15 through a spherical surface.

The upwardly convex spherical surface 18b is formed around the central hole of the upper surface of the middle lift core 17. The spherical surface 18b has the same curvature as that of the spherical surface 18a in the upper lift core 15 so that it can be combined with the spherical surface 18a.

Because the stopper bosses 20 are formed at locations of the upper lift core 15 corresponding to the locations of stopper recesses 19 formed on the spherical surface 18b of the middle lift core 17, they may be inserted into the stopper recesses 19 in the upper lift core 19.
The lower lift core 16 also is a four-sided block having a central hole for penetration of the lower core 11, and contacts a hydraulic slide mechanism. To this end, a linear groove is formed on the bottom surface of the lower lift core 16 to pass in one direction, and the bottom surface of the groove may have a tapered portion 23b. The tapered portion 23b has an inclination of about 1 degrees long a lengthwise direction of the groove.

When the lift core 13 for attaching the rotor core 100 having a stack structure is vertically moved, a hydraulic slide mechanism 14 is provided as a means for providing power for the movement. The hydraulic slide mechanism 14 functions to vertically move the entire lift core 13 using a forward/rearward linear operation, and includes a hydraulic cylinder 21 which is a driving source, a slider 22 for substantially moving the lift core 13.

The hydraulic cylinder 21 is supported by a cylinder bracket 24 on a side surface of a mold body, and the slider 22 horizontally extends forwards while being coupled to a rod of the hydraulic cylinder 21 and is disposed at the bottom of the lift core 13, that is, at the bottom of the lower lift core 16.

The slider 22 contacts the bottom surface of the lower lift core 16 through an upper surface thereof, and may vertically move the entire lift core 13 including the lower lift core 16 while moving forwards and rearwards during an operation of the hydraulic cylinder 21. To this end, the upper surface of the slider 22 has a tapered portion 23a having an inclination of about 1 degrees along a lengthwise direction of the slide, and the tapered portion 23a contacts the tapered portion 23b on the bottom surface of the lower lift core 16 in the same inclination direction.

Accordingly, if the slider 22 is moved forwards by a forward movement of the hydraulic cylinder 21, the lower lift core 16, the middle lift core 17, and the upper lift core 15 sequentially stacked due to the contact between the tapered portions 23a and 23b are raised. In contrast, if the slider 22 is moved rearwards by a rearward movement of the hydraulic cylinder 21, the lower lift core 16, the middle lift core 17, and the upper lift core 15 sequentially stacked due to the contact between the tapered portions 23a and 23b are lowered.

An in-use state of the molding apparatus for a rotor of a motor will be described as follows.

Figure 7:
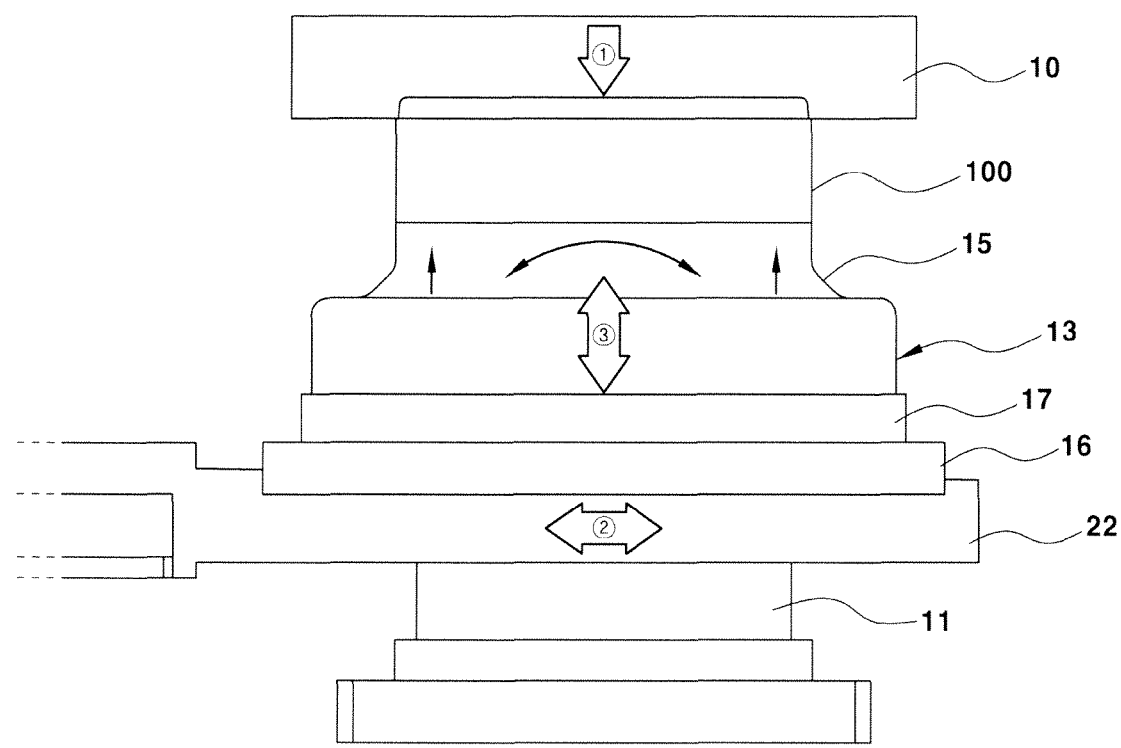
FIG. 7 is a front view showing an operational state of the molding apparatus for a rotor of a motor according to the embodiment of the present disclosure.

FIG. 7 is a front view showing an operational state of the molding apparatus for a rotor of a motor according to the embodiment of the present disclosure. As shown in FIG. 7, because a spring back phenomenon is reduced as the coupling method of sheets of the rotor core is changed from an embossing method to a bonding method, it becomes difficult to resize the rotor core in a molding process. Accordingly, the present disclosure applies an additional variable core attachment method.

Because a flash is generated in a molding process when a parallelism of the rotor core 100 inserted into the mold exceeds 0.02 mm, if the left and right sides of the rotor core 100 are not adhered, the upper lift core 15 is rotated and slid on the spherical surface such that, for example, the right surface thereof is accurately adhered with respect to a first adhered portion (for example, the left side of the drawing).

Then, because the sliding surface is a spherical surface, the directionality of the rotor core 100 is not limited.

When the upper lift core 15 is rotated and slid, a movement value of the upper lift core 15 is limited by a regulation function of the stopper bosses and the stopper recesses, whereby the safety of the mold can be secured (the mold is prevented from colliding with the slide core).

Parallelism errors such as discrepancies of a lower end, an upper end, and upper and lower end of the rotor core, or flatness errors, or squareness errors of the rotor core can be calibrated through the movement of the upper lift core 15.

Accordingly, after the bottom surface of the upper core 10 and the upper surface of the rotor core 100 are closed (1) through an operation of the mold or in the closing step is completed, the slider 22 of the hydraulic slide mechanism 14 is moved forwards (2) by 0 to 50 mm, and the bottom surface of the rotor core 100 and the upper surface of the upper lift core 15 are adhered to each other as the lift core 13 are vertically moved (3) by 0 to 1.0 mm.

The tolerance (−0.2 mm to +0.6 mm) of the entire thickness of the rotor core 100 according to the deviation of the thickness of the sheets is varied through the upper lift core 15, which is rotated and slid, that is, the bottom surface of the rotor core 100 and the upper surface of the upper lift core 15 are adhered to each other through rotation and sliding of the upper lift core 15 using the spherical surface, whereby generation of a flash can be prevented in the molding process (a flash is generated when an aperture of 0.02 mm or more is generated in the molding process).

As described above, according to the present disclosure, a force of a hydraulic slide can be vertically transferred without deformation of a product even if a flatness/parallelism level of a rotor core is low by applying, by applying a vertical movement structure of a lift core using associated operations of a hydraulic slide mechanism and the lift core, and a rotation and sliding structure of an upper lift core using a ball joint type (spherical contact type) between the upper lift core and a middle lift core, whereby generation of a flash can be prevented during a molding process.

What is claimed is:

1. A molding apparatus for a rotor of a motor, which is adapted to perform a process of molding a rotor core through insert injection-molding, the molding apparatus comprising:
   an upper core and a lower core respectively disposed on upper and lower sides of the molding apparatus;
   a rotor core interposed between the upper core and the lower core;
   a slide core disposed on a side surface of the rotor core relative to the upper core and the lower core;
   a lift core disposed at a bottom of the rotor core around the lower core, for pressing the rotor core while moving vertically; and a hydraulic slide mechanism for vertically moving the lift core through a forward or rearward linear movement.

2. The molding apparatus of claim 1, wherein:
the lift core is a combination of an upper lift core contacting the rotor core, a lower lift core contacting the hydraulic slide mechanism, and a middle lift core assembled between the upper lift core and the lower lift core, and
the upper lift core and the middle lift core contact each other through spherical surfaces, and the upper lift core is rotated and slid forwards, rearwards, leftwards, and rightwards.

3. The molding apparatus of claim 2, wherein stopper recesses and stopper bosses, which are fitted with each other, are formed on the spherical surfaces of the upper lift core and the middle lift core.

4. The molding apparatus of claim 3, wherein four combinations of the stopper recesses and the stopper bosses are disposed at an interval of 90 degrees in a circumferential direction of the lift core.

5. The molding apparatus of claim 1, wherein the hydraulic slide mechanism comprises a hydraulic cylinder, and a slider connected to a rod of the hydraulic cylinder to linearly move forward and rearward and contact the lift core, and wherein the slider and the lift core contact each other through tapered portions such that the lift core is vertically moved when the slider is linearly moved.

* * * * *